United States Patent [19]

Okuda et al.

[11] Patent Number: 5,320,782

[45] Date of Patent: Jun. 14, 1994

[54] ACICULAR OR PLATY TITANIUM SUBOXIDES AND PROCESS FOR PRODUCING SAME

[75] Inventors: Haruo Okuda; Toshinobu Yamaguchi; Hideo Takahashi, all of Yokkaichi, Japan

[73] Assignee: Ishihara Sangyo Kaisha, Ltd., Osaka, Japan

[21] Appl. No.: 983,282

[22] Filed: Nov. 30, 1992

Related U.S. Application Data

[63] Continuation of Ser. No. 779,249, Oct. 18, 1991, abandoned.

[30] Foreign Application Priority Data

Oct. 19, 1990 [JP] Japan .................................. 2-281402
Mar. 15, 1991 [JP] Japan .................................. 3-128855

[51] Int. Cl.$^5$ .......................... H01B 1/00; H01B 1/06; H01B 1/08
[52] U.S. Cl. .................................. 252/520; 252/518; 423/609; 75/235; 106/446
[58] Field of Search .................. 106/446; 423/609; 252/518, 520; 75/235; 420/417

[56] References Cited

U.S. PATENT DOCUMENTS

| | | | |
|---|---|---|---|
| 3,579,310 | 5/1971 | Lewis et al. | 423/610 |
| 4,075,031 | 2/1978 | Allen | 106/446 |
| 4,927,464 | 5/1990 | Cowie | 106/442 |

FOREIGN PATENT DOCUMENTS

| | | | |
|---|---|---|---|
| 45-6424 | 3/1970 | Japan . | |
| 45-18370 | 6/1970 | Japan . | |
| 47-44974 | 11/1972 | Japan . | |
| 1106414 | 5/1986 | Japan | 423/609 |
| 1264932 | 10/1989 | Japan . | |
| 292824 | 4/1990 | Japan . | |
| 2205088 | 11/1988 | United Kingdom . | |

Primary Examiner—Paul Lieberman
Assistant Examiner—M. Kopec
Attorney, Agent, or Firm—Cushman, Darby & Cushman

[57] ABSTRACT

Acicular or platy titanium suboxides, expressed by the general formula, TiOx where x is a positive real number less than 2, have a geometric anisotropy as an aspect ratio in the acicular or platy form of 3 or more, a higher specific surface area and a greater geometric anisotropy even in comparison on the basis of the same degree of reduction, and are capable of retaining their native configurations during the reduction. The resin mediums incorporated with the acicular or platy titanium suboxides have good electric properties, and a higher mechanical strength.

4 Claims, 4 Drawing Sheets

ACICULAR OR PLATY TITANIUM SUBOXIDES AND PROCESS FOR PRODUCING SAME

This is a continuation of application Ser. No. 07/779,249, filed on Oct. 18, 1991, which was abandoned upon the filing hereof.

BACKGROUND OF THE INVENTION

Field of the Invention

The present invention relates to acicular or platy titanium suboxides having a geometric anisotropy expressed by the general formula TiOx where x is a positive real number less than 2, and a process for producing the same. Acicular or platy titanium suboxides are useful as electroconductivity imparting materials or antistatic agents for plastics, rubbers and fibers, as well as for copying material supports such as receiving sheets to be used in electrophotography or electrostatography by making use of their electroconductivities, and as black or gray pigments for paints, and in addition as reinforcing materials for various resin compositions and rubber compositions by making use of their geometric anisotropy. The acicular or platy titanium suboxides according to the present invention may be also used as substances for the light controllable elements.

Description of the Related Art

Carbon blacks have heretofore been widely employed as electroconductive particles. However, they are poor in dispersibility into resin mediums, and uncertain of their Safety so that they have been only usable in the limited fields of application. For this reason, titanium suboxides TiOx are used where x is a positive real number of less than 2 produced by reducing particulate titanium dioxide. The particle configurations of the electroconductivity imparting materials should be desirably acicular or platy than spherical because the acicular or platy electroconductivity imparting particles cause more intimate contacts with one another in resin mediums resulting in achievement of desired electroconductivities with a lower amount of the materials incorporated. Under the circumstances, the present applicant has proposed a process for producing acicular titanium suboxides by reducing acicular titanium dioxide particles (Japanese Patent KOKAI (Laid-open) No. Hei 2-92824).

The acicular or platy titanium suboxide particles to be produced by reducing acicular or platy titanium dioxide particles are very susceptible to grain growth and particle sintering during the reduction to cause agglomeration and collapse of shapes so that they are difficult to retain their native configurations during the reduction. Such agglomerated titanium suboxides may have a wider distribution of particle size and different degrees of reduction. Incorporation of these titanium suboxides into resins may cause fluctuation in electroconducting and reinforcing performances as well as in colored appearance making it difficult to attain desired electroconductivity imparting effects and strength imparting effects. In order to overcome these problems, the present inventors have proposed a process for producing acicular titanium suboxides by conducting the reduction in the presence of a configuration retaining agent such as silicon compounds in an amount of 0.1 to 0.5 % by weight measured as oxides, as disclosed in Japanese Patent KOKAI (Laid-open) No. Hei 2-92824. However, there is still a need to develop finer titanium suboxide particles having an excellent geometric anisotropy as associated with development of higher quality materials. For satisfying the need, it is required to reduce much finer acicular or platy titanium dioxide particles. However, the finer the particles to be used, the higher the tendency to cause grain growth and sintering of particles. It is difficult under the current circumstances to produce desirable titanium suboxides having an excellent geometric anisotropy and a higher specific surface area.

Moreover, the titanium suboxides have a varying crystalline structure with a degree of reduction so that the progress of reduction makes it difficult to retain the starting configuration. Especially, TiOx within the region of $TiO_{1.0}$ to $TiO_{1.25}$ transforms into a NaCl type (rock salt type) crystalline structure with a volume contraction producing interstitial voids which may easily cause disintegration of crystals into discrete grains. Thus, the problem that the particle configuration is difficult to retain is produced. Incorporation of such acicular or platy titanium suboxides as being susceptible to disintegration in shape into resins may insufficiently achieve the effects contributed by their inherent configurations.

SUMMARY OF THE INVENTION

It is an object of the present invention to provide titanium suboxides having an excellent geometric anisotropy.

It is another object of the present invention to provide a process for producing such titanium suboxides as described above.

It is still another object of the present invention to provide acicular or platy titanium suboxides having a geometric anisotropy as an aspect ratio in the acicular or platy of 3 or more, expressed by the general formula, TiOx where x is a positive real number less than 2, and containing a silicon compound of over 0.5 % by weight up to 30 % by weight, preferably 3 to 20 % by weight as calculated as $SiO_2$.

It is still another object of the present invention to provide acicular or platy titanium suboxides expressed by the general formula, TiOx as above which are encapsulated with a highly dense silica coating layer having a thickness of 5 to 100 Å.

It is still another object of the present invention to provide acicular or platy titanium suboxides as above having an average largest particle size of 0.1 to 20 μm.

It is still another object of the present invention to provide a process for producing an acicular or platy titanium suboxide expressed by the general formula, TiOx where x is a positive real number less than 2, comprising reducing an acicular or platy titanium dioxide or hydrous titanium dioxide in the presence of a silicon compound of over 0.5 % by weight up to 30 % by weight as calculated as $SiO_2$.

DETAILED DESCRIPTION OF PREFERRED EMBODIMENTS

Figure 1:
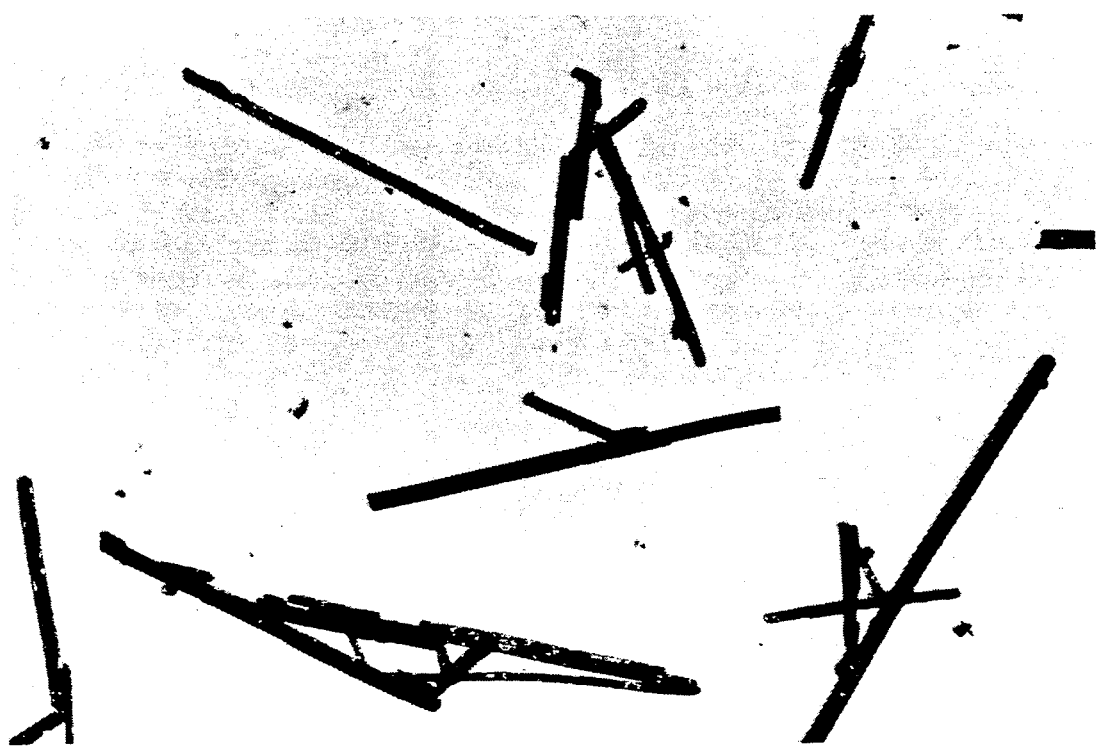
FIG. 1 is an electron microphotograph (at a magnification of 20,000) of the structure of the particles from Example 3.
Figure 2:
FIG. 2 is an electron microphotograph (at a magnification of 400,000) of the structure of the particles from Example 3.
Figure 3:
FIG. 3 is an electron microphotograph (at a magnification of 400,000) of the structure of the particles from Example 6.

The present inventors have made intensive research to overcome the aforementioned problems. As a result, there have been found a process for producing acicular or platy titanium suboxides by reducing acicular or platy titanium dioxide or hydrous titanium dioxide (hereunder referred to as acicular or platy titanium dioxide) particles in the presence of a silicon compound of over 0.5 by weight to 30 % by weight as calculated as $SiO_2$, where said titanium suboxides are characterized in that: (1) they are less susceptible to grain growth and sintering of particles during reduction, a good geometric anisotropy and a narrow distribution of particle size; (2) they have a uniform degree of reduction, i.e., a less fluctuation in the degree of reduction of particles; (3) they can easily retain their own configurations even having the general formula $TiO_x$ with x being of a lower value; and that (4) they have good electric properties, and a high mechanical strength, and they are controlled easily to desired color or shade as a black or gray colored material.

Furthermore, the present inventors have found that (5) acicular or platy titanium suboxides encapsulated with highly dense silica coating layer can be produced by coating acicular or platy titanium dioxide particles with a silicon compound to form encapsulating highly dense silica coatings and reducing the coated particles, (6) they are prevented from disintegrating into discrete primary grains of titanium suboxides due to the encapsulation allowing the particle configuration of the titanium suboxides to be retained without difficulties, and capable of imparting excellent properties such as electroconductivity to resin mediums, and that (7) during the reduction after coated with the highly dense silica coating layer, it is possible to conduct an intensive reduction where the use of alkylamines and ammonia should be most preferably used as reducing agents.

The present invention has completed based on the findings as described above.

In the present invention, the term "acicular or platy titanium suboxides" refers to the titanium suboxides including those having a geometric anisotropy such as rod type, fibrous, columnar, and the like, besides acicular and platy. The term "titanium suboxides" as used herein means the titanium suboxides expressed by the molecular formula, $TiO_x$ where x is a positive real number of less than 2, which have a different bonded oxygen content depending upon the extent of reduction from $TiO_2$ as well as mixtures of the titanium suboxides with titanium carbides, mixtures of the titanium suboxides with titanium nitrides, and titanium oxynitrides, and the like. TiO from $TiO_x$ has the same crystalline structure as that of TiN from titanium nitrides, both exhibiting almost the same X-ray diffraction pattern. The oxynitrides exhibit peaks, each of which is displaced to between the corresponding peaks of TiO and TiN.

The acicular or platy titanium suboxides according to the present invention can be expressed by the general formula $TiO_x$ where x is a positive real number of less than 2, and have an aspect ratio in the acicular or platy form of 3 or more, preferably 10 or more, and a content of a silicon compound of over 0.5 % by weight to 30 % by weight, preferably 3 to 20 % by weight as $SiO_2$. The aspect ratio in the acicular form refers to an average ratio of the largest dimension (the longest particle size along the longitudinal axis) to the shortest dimension (the smallest particle size in the transverse direction) of a particle in the form of acicular or the like, while the aspect ratio in the platy form refers to a ratio of an average value of the largest dimension to that of the shortest dimension selected from the three sides (i.e., the ordinate, abscissa, and thickness directions) of a particle in the form of platy or the like. Those average values may be determined by measurements on, for example, electron microphotographs. If the aspect ratio in the acicular or platy form is less than 3, it become undesirably less possible to achieve desired electric properties such as electroconductivity. The content of the silicon compound as configuration retaining agent of not higher than 0.5 % by weight allows an insufficient controlling of grain growth and particle sintering during the reduction with a wider distribution of particle size for the resultant particles. Even with the content of the silicon compound of higher than 30 % by weight, any additional effect in suppressing the sintering may not be attained.

In another embodiment of the present invention, the acicular or platy titanium suboxides are encapsulated with a highly dense silica coating layer, in which the acicular or platy titanium suboxides have a geometric anisotropy as expressed as an aspect ratio in the acicular or platy form of 3 or more, preferably 10 or more, and the general formula, $TiO_x$ where x is a positive real number of less than 2. The highly dense silica coating layer has a thickness of 5 to 100 Å, preferably 10 to 90 Å. The thickness of less than 5 Å makes it difficult for the titanium suboxides to retain their particle configuration, while even with the thickness of higher than 100 Å any additional enhancement in the effect retaining the configuration may not be expected. Although the thicknesses of the highly dense silica coating layer may be determined by measuring actually on electron microphotographs, or by calculation using an equation including an amount of the highly dense silica coated, the specific gravity thereof, and the specific surface area of the titanium dioxide particles prior to the reduction, actual measurements on electron microphotographs (at a magnification of 400,000) were employed in the present invention.

The produced acicular or platy titanium suboxides should have a particle size of 0.1 to 20 μm, preferably 0.1 to 10 μm, most preferably 0.2 to 5 μm as expressed by an average maximum particle size. If the average maximum particle size is lower than that range, the particles have a tendency to cause agglomeration upon incorporation into resin mediums, and a less ability to impart desired electric properties. If it is higher than that range, the surfaces of the coating films or sheets to be obtained with a mixture of the particles in a medium are undesirably poor in smoothness.

Acicular titanium dioxide or hydrous titanium dioxide particles to be used in the present invention may be produced by mixing rutile $TiO_2$, an alkali metal salt such as sodium chloride and an oxyphosphorus compound, and then calcining the mixture at a temperature of 725° to 1000° C. as disclosed in Japanese Patent Publication No. Sho 47-44974, or by mixing a $TiO_2$ source, a zinc compound, an alkali metal compound, and a phosphorus compound and calcining the mixture as disclosed in Japanese Patent Publication No. Sho 45-18370, or by treating fibrous alkali titanates with water and an acid to remove the alkalis. The acicular titanium dioxide particles produced by the aforementioned Japanese Patent Publications Nos. Sho 47-44974 and 45-18370 are usually leached with water after calcination to remove impurities such as alkali metals and phosphorus compounds, though the impurities may be extracted with an acid or alkaline solution prior to put the acicular titanium dioxide particles into use. The platy titanium dioxide or hydrous titanium dioxide particles may be produced by dissolving a titanium compound such as titanium tetrachloride into an organic solvent and then applying the solution onto a substrate heated at a high temperature as disclosed in Japanese Patent Publication No. Sho 45-6424. The acicular or platy titanium dioxide or hydrous titanium dioxide particles should have a particle size of about 0.1 to 20 $\mu m$ as expressed as an average maximum particle size and a specific surface area of 5 to 40 $m^2/g$.

The acicular or platy titanium dioxide particles may be subjected to classification before the reduction treatment to select particles of desired dimensions which will be put into use.

The acicular or platy titanium dioxides are incorporated with a silicon compound in an amount of over 0.5% by weight up to 30% by weight, preferably 3 to 20% by weight as $SiO_2$ based on the weight of the titanium dioxides. The silicon compounds include inorganic silicon compounds such as sodium silicate, potassium silicate and silica sols, and organic silicon compounds such as silane coupling agents, silicone oils and the like. The inclusion of the silicon compounds can be accomplished by many techniques such as ① adding a silicon compound such as sodium silicate to a slurry of the acicular or platy titanium dioxide particles and neutralizing or hydrolyzing the compound to deposit silicon compounds on the surfaces of the titanium dioxide particles, ② adding a silica solutions such as silica sols to a slurry of the acicular or platy titanium dioxide particles and evaporating the slurry to dryness, and ③ adding a silicon compound to acicular or platy titanium dioxide particles and mixing them. Acicular or platy titanium dioxide particles, for example, are obtained by powdering with a grinding machine such as Pulverizer. In order to achieve a uniformity of deposition of the silicon compounds on the surfaces of the acicular or platy titanium dioxide particles, the technique ① where a soluble silicate salt is added to the slurry of the titanium dioxide particles and neutralized with an acid or alkaline to effect the deposition is preferred. More particularly, in order to deposit the silicon compounds on the surfaces of the titanium dioxide particles in the form of the highly dense silica coating layer, the following procedure is desired:

For the deposition of highly dense silica, first a slurry of the acicular or platy titanium dioxides is prepared, added with an aqueous solution of a silicon compound, and then heated to a temperature of 60° C. or higher, or added with the silicon compound under an elevated temperature. Subsequently an acid is added to neutralize the slurry to pH 5.0 to 8.0, and thereafter dehydrated, washed, and if necessary, dried to produce acicular or platy titanium dioxide particles coated with a highly dense silica. If necessary, a dispersant such as sodium hexametaphosphate may be added in an amount of 0.01 to 0.5% by weight calculated as phosphorus based on the weight of the titanium dioxide particles to the titanium dioxide slurry prior to the addition of the silicon compound. The acids to be used as a neutralizing agent in this procedure include hydrochloric acid, sulfuric acid, nitric acid, and carbonic acid. In an embodiment of the present invention, the slurry of acicular or platy titanium dioxide particles is first adjusted with an alkaline to pH 9.5 to 11.0, then heated to a temperature of 60° C. or higher, preferably 70° C. or higher, most preferably 90° C. or higher, thereafter added with the silicon compound in small portions for 30 to 120 minutes, continued to maintain its temperature or heated to a temperature of 90° C. or higher, added gradually with an acid for 30 to 120 minutes to be neutralized, and then left for 60 to 120 minutes while the temperature is maintained, thereby forming highly dense silica coating layer. The alkaline to be used include sodium hydroxide, potassium hydroxide and ammonia. In another embodiment of the present invention, as a configuration retaining agent, an inorganic material such as phosphorus, alkali metals, alkaline earth metals, aluminum, zinc, niobium, tungsten, tantalum, may be incorporated before, during, or after the addition of the silicon compound, if necessary.

In the next step, the acicular or platy titanium dioxide particles are reduced with a reducing agent in the presence of the silicon compounds as described above to produce acicular or platy titanium suboxides. Especially, the reduction should be desirably performed after the deposition of the highly dense silica coating layer on the surfaces of the acicular or platy titanium dioxide particles because the acicular or platy titanium suboxides encapsulated with the highly dense silica coating layer are obtained. As the titanium suboxides vary in color and electric properties depending upon the value of x from the general formula $TiO_x$. Therefore, the conditions for the reduction treatment should be selected according to the end use. As reducing agents, one may mention ordinary metallic titanium powder, organic fatty acids such as oleic acid, stearic acid, and the like, and salts thereof, solid or liquid reducing agents such as carbon, ammonia, hydrazine, alkylamines such as methylamine and dimethylamine, gaseous reducing agents such as hydrogen and carbon monoxide, which may be used alone or in combination of two or more thereof. The use of metallic titanium powder, ammonia, hydrazine and alkylamines is preferred because the reduction proceeds at relatively low temperatures to produce titanium suboxides having a lower content of sintered particles. Particularly, alkylamines and ammonia are preferred reducing agents because of their high ability of effecting such intense reductions as resulting in a much smaller value of x from the $TiO_x$. The reduction may be performed, for example, by mixing the acicular or platy titanium dioxide particles containing the silicon compound with the solid or liquid reducing agents as described above and heating the mixture in an inert atmosphere, or by heating said titanium dioxide particles in an atmosphere of the gaseous reducing materials as described above. The reduction should be conducted at a temperature in the range of 700° to 1200° C., preferably 700° to 1000° C.

The reducing temperatures of lower than 700° C. may undesirably cause the rate of reduction to be lowered requiring a longer period of reduction time with less possibility to production of desired titanium suboxides. The higher temperature above 1200° C. makes it difficult to control grain growth even with the silicon compound being included. The reduction time depends upon the reducing temperature, composition of materials to be mixed, and the like, though it may be usually, but not limited to, 1 to 10 hours. The reduction treatment may be performed using various types of heating furnaces, though it is preferable in industry to perform in a rotating furnace.

The thus produced acicular or platy titanium suboxides may be prepared into an aqueous slurry, if necessary, and added with an alkaline such as sodium hydroxide, or an acid such as sulfuric acid to wash or dissolve the surfaces of the titanium suboxides to remove impurities. Alternatively, the produced acicular or platy titanium suboxides may be wet ground and/or classified, and then deposited on the surfaces of the titanium suboxides with one or more selected from the group consisting of inorganic compounds such as oxides, hydroxides, or hydrous oxides of silicon, aluminum, titanium, zirconium, tin, antimony and cerium, titanium coupling agents, silane coupling agents, polyvalent alcohols, and alkylamines, to enhance the dispersibility and durability of the titanium suboxides. An amount of the materials to be deposited should be in the range of 0.5 to 20 % by weight, preferably 1 to 10 % by weight for the inorganic compounds, and 0.1 to 10% by weight, preferably 0.3 to 3.0% by weight for the organic compounds, based on the weight of the titanium suboxides. The apparatuses to be used for wet grinding may be pebble mill, ball mill, sand mill, or the like. The classification devices to be used for classifying particles may be those using centrifugal power, such as a liquid type cyclon classifier.

The presence of the insulating silicon compounds in the titanium suboxide powder or on the surfaces of the titanium suboxide powder would be expected inherently to increase the resistivity of a powder body formed with the powder as well as the surface resistivity of a coating film formed with a medium containing the powder. However, it has been found surprisingly that the powder conductivity formed with the acicular or platy titanium suboxides according to the present invention is almost identical with those containing no silicon compound. Moreover, the coating films formed with a medium incorporated with the acicular or platy titanium suboxides according to the present invention have a higher electroconductivity due to good configurations of the acicular or platy titanium suboxides than those of films incorporated with the acicular or platy titanium suboxides containing no silicon compound. Particularly, incorporation of the acicular or platy titanium suboxides encapsulated with the highly dense silica coatings into a resin medium could impart much better electroconductivities thereto. An amount of the acicular or platy titanium suboxides according to the present invention to be incorporated into resins should be suitably in the range of 5 to 80% by weight, preferably 10 to 50% by weight as expressed as a concentration of the pigment.

The present invention will be illustrated with reference to some Examples and Comparative Examples hereunder.

EXAMPLE 1

Acicular titanium dioxide particles having an average largest dimension of 3.2 $\mu$m and an average shortest dimension of 0.07 $\mu$m and a specific surface area of 15.7 $m^2/g$ were produced by classifying the acicular titanium dioxide particles obtained as in Example 1 of Japanese Patent Publication No. Sho 47-44974. 100 g of the classified acicular titanium dioxide particles were dispersed in one liter of water to produce a slurry having a pH value of 7.0. The slurry was heated at 60° C., and added dropwise with an aqueous sodium silicate solution for 30 minutes. Subsequently, this slurry was neutralized to pH 7.0 by adding dropwise a diluted sulfuric acid for 40 minutes, dehydrated, and washed to yield acicular titanium dioxide particles coated with the silicon compound (8 % by weight as $SiO_2$).

Then, to the acicular titanium dioxide particles coated with the silicon compound ($TiO_2$ content: 90.5 % by weight), a metallic titanium powder (particle size: $-325$ mesh, purity: 99.1 % by weight) was uniformly mixed in a molar ratio of 3:1 to produce a mixture which was charged in the rotary furnace and heated at 850° C. for 3 hours in an inert atmosphere, i.e., under flowing nitrogen gas. The resultant product was cooled to 70° C. in the same atmosphere, further left to cool to room temperature in air, thereby producing the present acicular titanium suboxides (Sample A). It was found that the Sample A had a powder conductivity of 1.5 $\Omega$ cm and color indices, L, a, and b values of 27.9, $-2.9$, and $-11.8$, respectively, in the form of a powder body. The powder conductivity was determined by measuring a DC resistance of a compressed powder body in the columnar form which was formed by pressing a sample powder under a pressure of 100 Kg/$cm^2$. COMPARATIVE EXAMPLE 1

The same treatment as in Example 1 was repeated, except that the silicon compound was deposited in an amount of 0.4% by weight as $SiO_2$, to produce acicular titanium suboxides (Sample B). The Sample B had a powder conductivity of 2.1 $\Omega$ cm and color indices, L, a, and b values of 34,2, $-2.4$, and $-5.7$, respectively, in the form of a powder body and the identical degree of reduction with that of Sample A in Example 1. The observation of the electron microphotographs revealed that the acicular particles of Sample B were broken down or collapsed and formed in a lump by sintering.

EXAMPLE 2

Acicular titanium dioxide particles coated with the silicon compound produced by the same treatment as in Example 1 were charged in the rotary furnace having an inside diameter of 15 cm which was swept with nitrogen gas. Thereafter, the furnace was heated at 950° C. for 3 hours under a gaseous methylamine flowing through the furnace at a rate of 5 liters per minute. Then the resultant product was cooled to 100° C. under the same atmosphere, and further left to cool in air to room temperature to give the present acicular titanium suboxides (Sample C). This Sample C was titanium oxynitride (X-ray diffraction pattern indicated that the main peak has a Bragg angle of 42.94°), and had a powder conductivity of 0.010 $\Omega$cm and color indices, L, a, and b values of 19.8, 2.5, and 3.8, respectively, in the form of a powder body.

EXAMPLE 3

1 00 g of the acicular titanium dioxide particles from Example 1 were dispersed in one liter of water to produce a slurry which was adjusted to pH 1 1.0 with an aqueous sodium hydroxide solution. The slurry was then heated at 70° C., and added dropwise with an aqueous sodium silicate solution for 30 minutes. Subsequently, this slurry was heated to 90° C. and neutralized to pH 7.0 by adding dropwise a diluted sulfuric acid for 40 minutes, and maintained further for 60 minutes. Thereafter, the slurry was dehydrated, and washed to give acicular titanium dioxide particles coated with the silicon compound (8% by weight as $SiO_2$).

Then, the acicular titanium dioxide particles coated with the silicon compound were charged in the rotary furnace having an inside diameter of 15 cm which was swept inside with nitrogen gas. Thereafter, the furnace was heated at 950° C. for 3 hours under a gaseous methylamine flowing through the furnace at a rate of 5 liters per minute. Then the resultant product was cooled to 100° C. under the same atmosphere, and further left to cool in air to room temperature to produce the present acicular titanium suboxides (Sample D). This Sample D was titanium oxynitride and encapsulated with highly-dense silica coating films having a thickness of 63 Å. It had a powder conductivity of 0.015 Ωcm and color indices, L, a, and b values of 18,7, 2.3, and 3.3, respectively, in the form of a powder body.

COMPARATIVE EXAMPLE 2

The same treatment as in Example 2 was repeated, except that acicular titanium suboxide particles having no silicon compound coating were used, to produce acicular titanium suboxides (Sample E). The Sample E was titanium oxynitride and had a powder conductivity of 0.01 5 Ωcm and color indices, L, a, and b values of 21.8, 2.5, and 4.7, respectively, in the form of a powder body, and almost the same degree of reduction as that of Sample C in Example 2. The observation of the electron microphotographs revealed that the acicular particles of Sample E were broken down or collapsed and formed in a lump by sintering.

EXAMPLE 4

Acicular titanium dioxide particles having an average largest dimension of 0.7 μm and an average shortest dimension of 0.04 μm and a specific surface area of 35.0 $m^2/g$ were produced by classifying the acicular titanium dioxide particles obtained by the similar procedure to that of Example 1 of japanese Patent Publication No. Sho 47- 44974. The classified acicular titanium dioxide particles were treated in the same manner as in Example 1 to provide acicular titanium dioxide particles coated with the silicon compound (containing 8% by weight as $SiO_2$). The acicular titanium dioxide particles were charged in the rotary furnace having an inside diameter of 15 cm which was swept inside with nitrogen gas, and then with ammonia gas. Thereafter, the furnace was heated at 875° C. for 6 hours under a gaseous ammonia flowing through the furnace at a rate of 8 liters per minute. The resultant product was cooled to 100° C. under the same atmosphere, and further left to cool in air to room temperature to produce the present acicular titanium suboxides (Sample F). This Sample F was titanium oxynitride and had a powder conductivity of 1.1 Ωcm and color indices, L, a, and b values of 22.5, −0.4, and 2.4, respectively, in the form of a powder body.

COMPARATIVE EXAMPLE 3

The same treatment as in Example 4 was repeated, except that the silicon compound was deposited in an amount of 0.4 % by weight as $SiO_2$, to produce acicular titanium suboxides (Sample G). The Sample G was titanium oxynitride and had a powdery conductivity of 1.0 Ωcm and color indices, L, a, and b values of 23.0, 0.4, and −0.3, respectively, in the form of a powder body, and almost the same degree of reduction as that of Sample F in Example 4. The observation of the electron microphotographs revealed that the acicular particles of Sample G were broken down or collapsed and formed in a lump by sintering.

EXAMPLE 5

The same treatment as in Example 4 was repeated, except that the heating was conducted in an atmosphere of gaseous ammonia, to produce the present acicular titanium suboxides (Sample H). The Sample H was titanium oxynitride and had a powder conductivity of 0.011 Ωcm and color indices, L, a, and b values of 15.8, 1.5, and −1.0, respectively, in the form of a powder body.

EXAMPLE 6

100 g of the acicular titanium dioxide particles from Example 4 were dispersed in one liter of water to produce a slurry which was adjusted to pH 11.0 with an aqueous sodium hydroxide solution. The slurry was then heated to 70° C., and added dropwise with an aqueous sodium silicate solution for 30 minutes. Subsequently, this slurry was heated to 90° C. and then neutralized to pH 7.0 by adding dropwise a diluted sulfuric acid for 40 minutes, and maintained further for 60 minutes. Thereafter, the slurry was dehydrated, and washed to give acicular titanium dioxide particles coated with the silicon compound (8% by weight as $SiO_2$).

Then, the acicular titanium dioxide particles coated with the silicon compound were charged in the rotary furnace having an inside diameter of 15 cm which was swept inside with nitrogen gas and then with an ammonia gas. Thereafter, the furnace was heated at 950° C. for 6 hours under a gaseous ammonia flowing through the furnace at a rate of 8 liters per minute. Then the resultant product was cooled to 100° C. under the same atmosphere, and further left to cool in air to room temperature to produce the present acicular titanium suboxides (Sample I). This Sample I was titanium oxynitride and encapsulated with highly dense silica coating films having a thickness of 50 Å. It had a powder conductivity of 0.018 Ωcm and color indices, L, a, and b values of 15.5, 1.4, and −1.9, respectively, in the form of a powder body.

COMPARATIVE EXAMPLE 4

Figure 4:
FIG. 4 is an electron microphotograph (at a magnification of 400,000) of the structure of the particles from Comparative Example 4.
Figure 5:
FIG. 5 is an electron microphotograph (at a magnification of 400,000) of the structure of the particles from Example 7.
Figure 6:
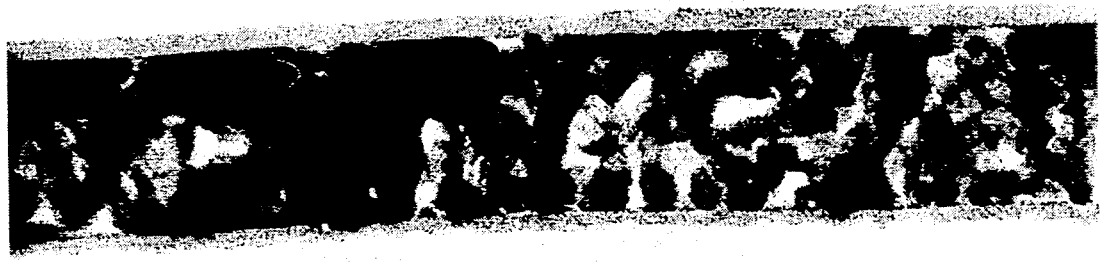
FIG. 6 is an electron microphotograph (at a magnification of 400,000) of the structure of the particles from Example 8.
Figure 6:

The same treatment as in Example 5 was repeated, except that acicular titanium suboxide particles having no silicon compound coating were used, to produce acicular titanium suboxides (Sample J). The Sample J was titanium oxynitride and had a powder conductivity of 0.010 Ωcm and color indices, L, a, and b values of 15.0, 1.6, and −0.9, respectively, in the form of a powder body, and almost the same degree of reduction as that of Sample H in Example 5. The observation of the electron microphotograph (FIG. 4) revealed that the acicular particles of Sample J were broken down or collapsed and formed in a lump by sintering.

EXAMPLE 7

Acicular titanium dioxide particles coated with the silicon compound produced by the same treatment as in Example 4 were charged in the rotary furnace having an inside diameter of 15 cm which was swept inside with nitrogen gas. Thereafter, the furnace was heated at 800° C. for 3 hours under a gaseous methylamine flowing through the furnace at a rate of 5 liters per minute. Then the resultant product was cooled to 100° C. under the same atmosphere, and further left to cool in air to room temperature to give the present acicular titanium suboxides (Sample K). This Sample K was titanium oxynitride, and had a powder conductivity of 0.012 Ωcm and color indices, L, a, and b values of 13.3, 2.2, and −1.0, respectively, in the form of a powder body.

EXAMPLE 8

Acicular titanium dioxide particles coated with the silicon compound produced by the same treatment as in Example 6 were charged in the rotary furnace having an inside diameter of 15 cm which was swept inside with nitrogen gas. Thereafter, the furnace was heated at 800° C. for 3 hours under a gaseous methylamine flowing through the furnace at a rate of 5 liters per minute. Then the resultant product was cooled to 100° C. under the same atmosphere, and further left to cool in air to room temperature to give the present acicular titanium suboxides (Sample L). This Sample L was titanium oxynitride particles encapsulated with highly dense silica coating films having a thickness of 50 Å. It had a powder conductivity of 0.011 Ωcm and color indices, L, a, and b values of 13.1, 2.2, and −1.1, respectively, in the form of a powder body.

COMPARATIVE EXAMPLE 5

The same treatment as in Example 7 was repeated, except that acicular titanium suboxide particles having no silicon compound coating were used, to produce acicular titanium suboxides (Sample M). The Sample M was titanium oxynitride and had a powder conductivity of 0.010 Ωcm and color indices, L, a, and b values of 13.3, 2.4, and −1.0, respectively, in the form of a powder body, and almost the same degree of reduction as that of Sample K in Example 7.

Figure 7:
FIG. 7 is an electron microphotograph (at a magnification of 400,000) of the structure of the particles from Comparative Example 5.

The acicular titanium suboxides obtained in Examples and Comparative Examples as described above were determined for their specific surface area (m²/g) by BET method, and the results are reported in Table 1. The observation of the electron microphotograph (FIG. 7) revealed that the acicular particles of Sample M were broken down or collapsed and formed in a lump by sintering.

TABLE 1

| | Sample | Specific surface area (m²/g) |
| --- | --- | --- |
| Example 1 | A | 12.9 |
| Comparative Example 1 | B | 4.8 |
| Example 4 | F | 31.0 |
| Comparative Example 3 | G | 7.7 |

20 g of each of Sample powders obtained in Examples and Comparative Examples were mixed with 30.6 g of acrylic resin, ACRYDIC A-165-45 (solids 45% by weight; available from DAINIPPON INKI KAGAKU K.K.), 16.4 g of a mixed solution of toluene/butanol in a ratio of 1 : 1 by weight, and 50 g of glass bead, and thereafter placed in the PAINT-SHAKER #5110 available from Red devil Co. and shaked for 30 minutes to prepare a mill base for each Sample.

To each mill base were added predetermined amounts of the acrylic resin and the mixed solution of toluene/butanol as described above to attain a concentration of each pigment of 20% by weight, and mixed with stirring to prepare a paint. This paint was applied on a sheet of coated paper to a film thickness of 20 μm and left to dry for 40 hours to produce a test sheet. The test sheet was then determined for surface resistivity by measuring an electric resistance of the sheet with the digital ohm meter R-506 available from KAWAGUCHI DENKI SEISAKUSHO, and calculating the surface resistivity (Ω/square) using the following equation:

Surface resistivity = Found value × 50 (Electrode const.)

The results obtained are shown in Table 2.

TABLE 2

| | Sample | Surface resistivity (Ω/square) |
| --- | --- | --- |
| Example 2 | C | $1.7 \times 10^6$ |
| Example 3 | D | $1.2 \times 10^4$ |
| Comparative Example 4 | E | $8.5 \times 10^9$ |
| Commercial product | | above $10^{14}$ |

As can be seen from Examples and Comparative Examples, the acicular or platy titanium suboxides according to the present invention are those which are capable of retaining their native configurations during the reduction and have a higher specific surface area and a greater geometric anisotropy even in comparison on the basis of the same degree of reduction.

The resin mediums incorporated with the acicular or platy titanium suboxides according to the present invention have good electric properties, and a higher mechanical strength indicating that the acicular or platy titanium suboxides according to the present invention have excellent characteristics.

What is claimed is:

1. Electrically conductive titanium oxide composition having a low surface resistivity comprising:
   a capsule of silicon dioxide having a thickness of 5 to 100 Å; and
   at least one compound selected from the group consisting of titanium suboxides and titanium oxynitride encapsulated within said capsule, said titanium suboxides having the general formula $TiO_x$, x being a positive real number less than 2, said titanium oxynitride having the general formula TiON, and said at least one compound being retained by said capsule in an acicular or platy form having an average largest dimension in the range of 0.1 to 20 μm and an aspect ratio of not less than 3; said titanium oxide composition being produced by the process comprising the steps of:
   forming a slurry comprising acicular or platy titanium oxide;
   adjusting a pH of the slurry to 9.5 to 11.0;
   adding a silicon compound to form a capsule of silicon dioxide which encapsulates said acicular or platy titanium oxide; and reducing said acicular or platy titanium oxide in said capsule to produce said at least one compound encapsulated in said capsule.

2. The titanium oxide composition according to claim 1, wherein said aspect ratio is not less than 10.

3. The titanium oxide composition according to claim 1, wherein said average largest dimension is in the range of 0.1 to 10 μm.

4. The titanium oxide composition according to claim 1, wherein said thickness of said capsule is 10 to 90 Å.

* * * * *